March 19, 1940.　　　I. GELLER　　　2,194,016
FISH SPEARING GAFF
Filed Jan. 3, 1939　　　2 Sheets-Sheet 1
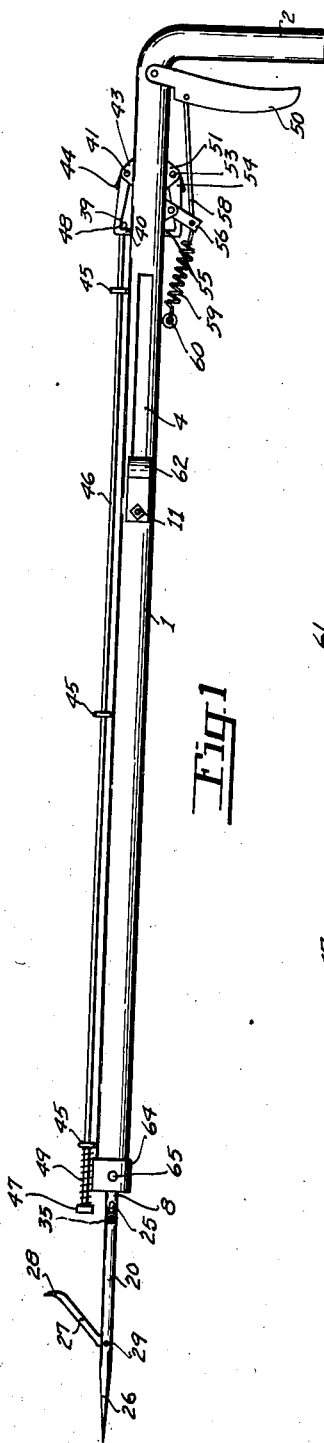
INVENTOR.
ISAAC GELLER
BY
Samuel S. Jacobson
ATTORNEY.

March 19, 1940.   I. GELLER   2,194,016
FISH SPEARING GAFF
Filed Jan. 3, 1939   2 Sheets-Sheet 2
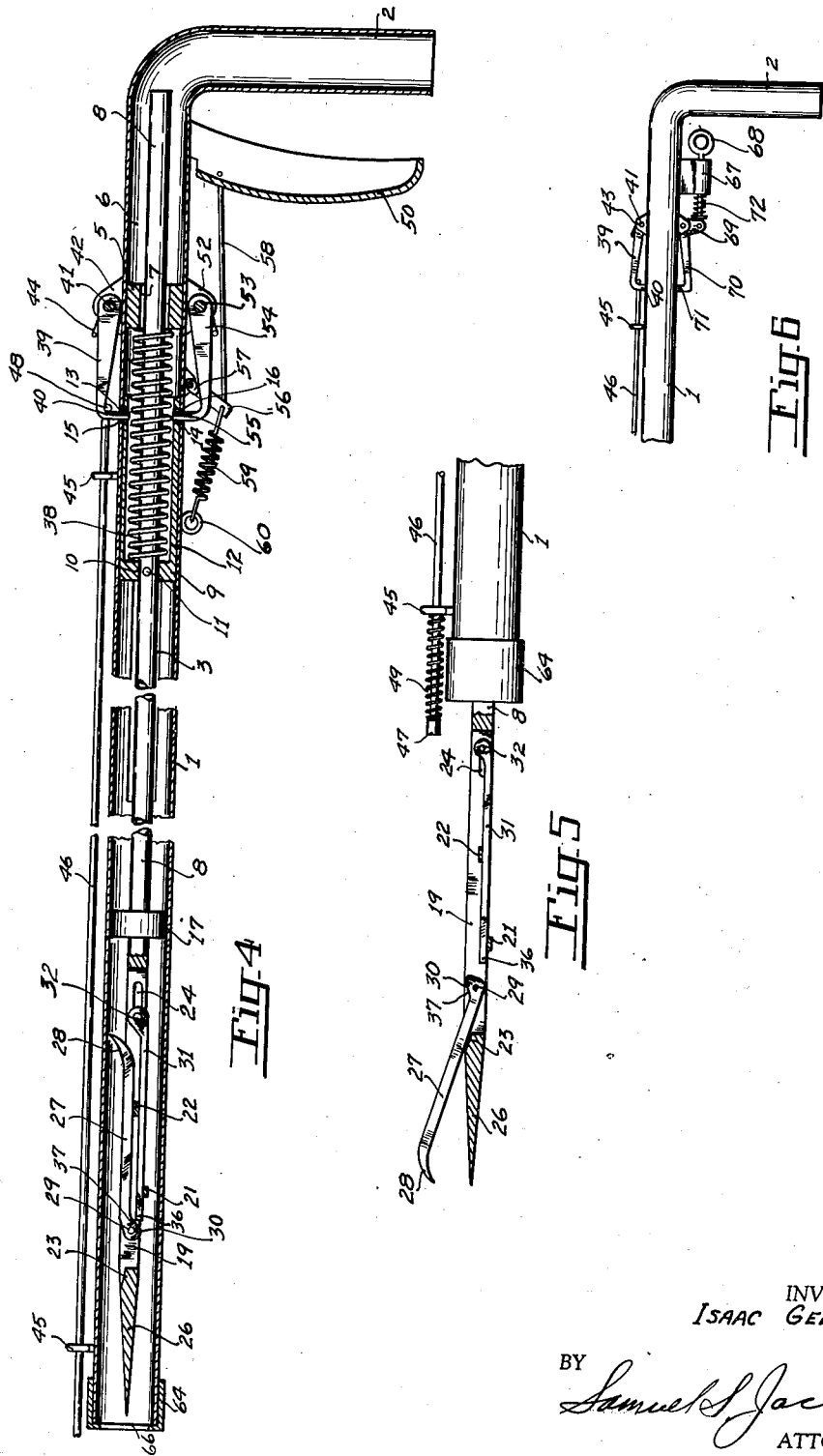
INVENTOR.
ISAAC GELLER
BY
Samuel S. Jacobson
ATTORNEY.

Patented Mar. 19, 1940

2,194,016

UNITED STATES PATENT OFFICE 2,194,016

FISH SPEARING GAFF

Isaac Geller, Portland, Oreg.

Application January 3, 1939, Serial No. 249,058

13 Claims. (Cl. 43—6)

This invention relates to fish-spearing devices and particularly to spring-actuated fish-spearing gaffs controlled by a pressure-responsive trigger mechanism and having means to control the position of the barb or hook and means for insuring against accidental discharge of the pressure-responsive trigger mechanism.

It is hardly necessary to point out that successful fishing requires more than a knowledge of how to handle a rod and reel. Once a fish is hooked and reeled in toward the fisherman, it is necessary to bring it immediately to the surface and to land it without risking its loss and without employing too much time and effort. The landing operation is now accomplished in divers ways, but the most common device presently employed is a hook-shaped gaff possessing a handle. The use of such type of gaff by fishermen has disclosed many disadvantages, the most glaring of which is that the fisherman must not only employ sufficient energy in handling the gaff, but, to handle it with a modicum of success, it is also necessary to describe a substantial arc with one's hand as the gaff is directed toward the fish in order for the hook of the gaff to penetrate the body of the fish, and be retained therein. Any fisherman knows that a fish is a very uncertain target as it thrashes about in the water; and as a consequence of this uncertainty, the fisherman oftentimes misses his mark and loses his fish. The net result of using the type of gaff referred to is that a fisherman must employ too much energy in using it and is not certain of landing a fish with it.

The main object of the invention, therefore, is to provide a fish-spearing gaff by means of which a fish, when caught and brought to the surface, can readily be landed without use of a great deal of time and energy and which does not require the fisherman to endure the disadvantages which are inherent in the types of gaffs, including the type of gaff referred to above, now employed by fishermen.

Before pointing out other objects of the invention, it is advisable to relate, in general terms, of what the invention consists. The invention consists of a tubular casing in which a shaft or rod is slidably disposed in longitudinal relation thereto. This shaft has a number of elements which are employed to effectively impale a fish when a portion of the rod is discharged from the tubular casing. A coiled compression spring is trapped within the tubular casing, encircles the shaft and is compressed when the shaft is confined in the tubular casing. It is this compressed spring which is employed as the force by means of which a portion of the shaft or rod is ejected from the casing. Means are secured to the shaft or rod which, in cooperation with means secured to the casing, limits the distance of travel of the shaft or rod. Means are also provided within the rod for controlling the position of the barb or prong relative to the shaft or rod. There is also provided a pressure-responsive, shaft-releasing mechanism which is capable of effecting the instantaneous release of the shaft from the casing by permitting the compressed spring to be released from its tension and to force a portion of the shaft from the casing. A safety mechanism is employed which, when in normal position, prevents the shaft or rod from moving, even though the pressure-responsive, shaft-releasing mechanism is actuated and disengaged from the shaft or rod.

An important object of the invention is to provide a fish-spearing gaff which a fisherman can easily and effectively manipulate with one hand, leaving his other hand entirely free.

Another object of the invention is to provide means for releasing the shaft or rod upon contact of said means with any portion of a fish.

A further object of the invention is to provide means for preventing the accidental discharge of the shaft or rod from its retracted position notwithstanding the actuation of the pressure-responsive shaft-releasing mechanism.

Still another object of the invention is to provide means for readily removing the barb or prong from the fish, when desired, without damaging the fish.

A further object of the invention is to provide manually operated means for retracting the shaft or rod into the casing after it has been discharged.

Another object of the invention is to provide a barb or prong which may be readily replaced if damaged or destroyed.

A still further object of the invention is to provide a fish-spearing gaff which is relatively simple in operation, light in weight, and durable in construction.

Advantages, objects, and functions not referred to above will be revealed in the following description which, for convenience and intelligent understanding, must be read in connection with the accompanying drawings disclosing, for practical considerations, only an exemplary structure embodying the principles of the invention, and in which:

Figure 1 is an elevational, side view of the device embodying the principles of the invention;

Figure 2 is a fragmentary, elevational view of the device embodying the principles of the invention, a portion of which is broken away to show details of construction;

Figure 3 shows a fragment of the device and a sectional view of the fish-impaling elements and the means for adjusting the same;

Figure 4 is a fragmentary, sectional, side view of the device embodying the principles of the invention, revealing its structural characteristics;

Figure 5 shows a fragment of the device and a sectional view of the fish-impaling elements and means for adjusting the same, as shown in Figure 3 but in different positions; and Figure 6 shows a fragment of the device embodying the invention and reveals a modified safety mechanism.

Elements possessing similar or corresponding characteristics and functions will be identified by like reference characters in all of the figures of the drawings.

The fish-spearing gaff embodying the principles of the invention consists of a cylindrical tube or casing 1. The casing and the other elements may and preferably will be made of a light but durable, rust-resisting metal. A handle portion 2 is formed at right angles to and projects laterally from the top of the casing 1. A pair of elongated slots 3 and 4 are formed within the sides of the casing and are in direct opposite alignment to each other. A stop 5 is fixedly secured within the interior 6 of the casing and is formed with a central opening 7 therein to accommodate the shaft or rod 8. Rod 8 is adapted for longitudinal movement with relation to the casing 1 and passes through opening 7 of stop 5.

A piston 9, having a central opening 10 formed through its base and no top, encircles the rod 8 and is removably secured thereto in any desirable fashion as by the employment of a pin 11 which passes through the rod 8 and the base of the piston 9, acting also as a support for a pair of rod-cocking members soon to be described. The wall 12 of the piston 9 contacts the inner wall of the casing 1 and the piston is adapted for reciprocation within the interior 6 of casing 1. A pair of apertures 13 and 14 are formed in the wall 12 of the piston 9. These openings are in direct opposite alignment to each other and, when the piston 9 is in the position shown in Figure 4 (the full, retracted position), are in registerable alignment with openings 15 and 16 respectively formed in casing 1 and disposed in direct opposite alignment with each other. The function of these openings will be discovered as the description of the invention is unfolded.

A sleeve 17 is also secured to or made an integral part of rod 8. This sleeve is positioned approximately midway between the base of the piston 9 and the lower end of the rod 8. Its position on the rod 8 is controlled directly by the length of the slots 3 and 4, since the functions of sleeve 17 are to limit the distance which the rod 8 may travel and to take up the shock caused by the release of the compression on the coil spring hereafter to be described without allowing any other elements attached directly or indirectly to the rod 8 and riding within slots 3 and 4 to take up the shock.

An elongated slot 18 is formed in the portion of rod 8 disposed immediately below the sleeve 17, thus dividing this portion of rod 8 into walls 19 and 20, joined to each other by guide members 21 and 22. An angularly disposed cut-out portion 23 merges into the lower portion of slot 8, as shown best in Figure 2. A short slot 24 is formed in wall 19 and an identical slot 25 is formed in wall 20. These slots are disposed in registerable alignment with each other and serve as guideways for an adjusting member to be forthwith described.

The non-slotted portion of rod 8 immediately below slot 18 tapers to form a sharply pointed head 26. An impaling member, such as a prong 27, having a pointed, arcuately-shaped end 28, is swingably movable within slot 18 and pivotally connected to walls 19 and 20 by a common pivot-pin 29. An extension 30 is formed in the prong 27 near the pivotal connection and serves to cooperate with arm 31 for retaining the prong in the desirable positions.

Arm 31 is completely confined between walls 19 and 20 and is slidable between guides 21 and 22 in longitudinal relation to the walls 19 and 20. When arm 31 is in its operative position, the opening 32, formed near its top end, is in direct alignment with slots 24 and 25. A threaded bolt 33 with a head 34 passes through the slots 24 and 25 and through opening 32 providing a support for arm 31, with the slots acting as guideways for the bolt and travel-limiting means for the arm. A nut 35 is threadably disposed on the threaded end of the bolt. When the bolt and nut arrangement referred to is tightened relative to each other, the arm 31 is prevented from moving longitudinally between the walls 19 and 20, and when loosened, the arm may move longitudinally within the limits described by the sides of the slots 24 and 25.

The arm 31 and its cooperative structural elements control, for a predetermined degree, the position of the prong 27. An examination of Figure 3 is pertinent to a clear understanding of this function. It will be seen from Figure 3 that the arm 31 is positioned so that it extends as far below the slots 24 and 25 as it can possibly be extended, and when in this position, its lower end 36 engages the top 37 of extension 30 and acts as a stop for the prong 27, so that the prong cannot go below the position shown in Figure 3 unless, of course, the arm 31 is moved upwardly within the slots 24 and 25 for a short distance. If, however, the arm 31 is moved longitudinally within the slots 24 and 25, so that it reaches the position within those slots shown in Figure 5, the end 36 will disengage from the extension 30 and will therefore permit the prong 27 to swing on its pivot 29, so that it can reach its lowest position and be seated in the cut-out portion 23. It is evident from Figures 3 and 5 that prong 27 is free to move on its pivot in one direction, but its movement in the opposite direction is completely controlled by the position of arm 31. The desirability of providing such adjustment and release for the prong 27 must be apparent, when consideration is given to the use for which this device is intended. The effective impalement of a fish by the head 26 and prong 27 of a spring-actuated gaff would be of slight value, if, as a result, the fish were mutilated beyond value because of the difficulty of removing the head and prong from the fish. By controlling the position of the prong such mutilation is completely avoided. To accomplish this it is only necessary to disengage the prong from its temporary association with the end of arm 31, so that the prong may reach the position most conducive to its removal from the fish without materially damaging them.

A coiled compression spring 38 encircles the rod 8, is seated against the base of, and is partially surrounded by, the wall 12 of piston 9. The other end of the spring 38 is urged against the underside of stop 5. In this manner the spring 38 is confined and trapped in the interior 6 of casing 1. It should now be evident that, when spring 38 is compressed toward stop 5, so that it is positioned as shown in Figure 4, it is necessary to provide some means for locking the rod 8 against longitudinal movement within the interior 6 of casing 1; otherwise the rod, acting under the influence of the compressed spring 38, would be ejected from the casing.

There is, therefore, provided a pressure-responsive rod-releasing mechanism which is positioned so that it may engage the opening 13 formed in the wall 12 of piston 9 and the opening 15 formed within casing 1. This pressure-responsive mechanism consists of an arm 39 which tapers to form a pin 40 positioned at right-angles to the arm. It is this pin 40 which is adapted for insertion into openings 13 and 15 of piston 9 and casing 1 respectively. The arm 39 is secured to shaft 41 which is supported by ears 42 and 43 extending outwardly from the casing wall as best shown in Figure 2. A spring 44, anchored at one end to ear 42 and having its other end positioned on arm 39, at all times urges the arm and, of course, the pin portion toward and into openings 13 and 15. A number of eyes 45 extend vertically from the wall of casing 1 in spaced parallel relation to each other and serve as guides for rod 46. Rod 46 extends slightly below casing 1 and is formed with a head 47 at its lower end and a right-angled tripping portion 48 at its other end which contacts the under side of arm 39 so that, as the rod is forced upwardly, the tripping portion 48 rides against the underside of arm 39 and forces its pin portion 40 from opening 13 against the resistance of spring 44. A spring 49 encircles the rod 46 and is confined between the lowest ear 45 and the head 47 and continuously urges the rod to retain the position best shown in Figure 1.

It is evident from the disclosure and previous description that, unless a safety control is provided, the device may be considered a dangerous instrumentality, since a slight touch of the head 47 is sufficient to remove the pin portion 40 from opening 13 and release the piston 9 which immediately would be discharged from the casing by the compressed spring 38. While this is the ultimate purpose of the invention, still caution and good judgment were the controlling factors for providing means against the accidental discharge of the rod 8.

The safety mechanism employed consists of a bifurcated hand grip 50 which is hingedly secured in any desirable manner to the casing 1. A pair of ears 51 and 52 are employed as supports for shaft 53 from which arm 54, having a pin portion 55 possessing identical structural characteristics and functions as arm 39, depends. The pin portion 55 is adapted for insertion into openings 14 and 16 of piston 9 and casing 1 respectively. A spring (not shown), identical in structure and function to spring 44, normally urges the pin portion 55 of arm 54 toward and into the openings 14 and 16. A U-shaped cam support 56, having a cam 57 confined therein, is hingedly secured in any well-known manner against the casing 1 and about the arm 54, so that the cam 57 is in alignment with the arm 54. A link 58 connects the U-shaped cam support 56 to the hand grip 50 and a tensioned spring 59, secured to eye 60 and to the cam support 56, normally urges the hand-grip 50 and the cam support 56 to be maintained in the position best shown in Figure 4.

In order to facilitate the insertion of the rod 8 and its related elements into casing 1 against the normal resistance of spring 38, a pair of cocking grips 61 and 62 are provided. These are secured to the pin 11 which passes through the rod 8 and the base of piston 9. Spacer members 63 are provided between the wall 12 of piston 9 and the cocking members 61 and 62. These spacer members ride within slots 3 and 4. It is evident from this description that by pulling the cocking members 61 and 62 upwardly the rod and its related elements will be retracted into the casing 1, so that it will assume the position shown in Figure 4.

It was stated before that the function of sleeve 17 is to limit the distance which the rod 8 may travel and to take up the shock caused by the release of the compression on coil spring 38 without allowing any other elements attached directly or indirectly to the rod 8 and riding within slots 3 and 4 to take up the shock. Sleeve 17, however, could not perform its function without the employment of collar 64 which is secured in any desirable manner, as by threaded screws 65, to the bottom of casing 1. Collar 64 has an opening 66 therein, the circumference of which is slightly smaller than the circumference of sleeve 17 and materially greater than the area required by rod 8 and its attached members, when viewed in cross-section, as it passes through the opening 66 under the urging of spring 38. Thus it appears that the under side of the sleeve 17 contacts the collar 64 on the downward stroke of the rod 8 and in this manner the longitudinal movement of the rod relative to the casing is controlled and the shock absorbed.

A slightly modified type of safety release mechanism is shown in Figure 6 which consists of a bracket 67 secured to the casing 1. An eye-headed pin 68 is slidably disposed within the bracket 67 and is secured to the bell crank 69 which is, in turn, pivotally secured in any well-known manner to casing 1. The arm 70 of bell crank 69 is formed with a pin portion 71 which functions in the identical manner as pin portion 55 of arm 54. A spring 72, disposed between the other side of the bracket 68 and the bell crank 69, normally urges the pin portion 71 of arm 70 toward and into openings 14 and 16.

This completes the description of the elements employed in the device embodying the principles of my invention. The fish-spearing gaff hereinabove described is operated in the following manner:

When the elements of the device are in the position disclosed in Figure 4, the device is ready to be used by a fisherman for impaling fish. In this position the spring 38 has been compressed by the insertion of the rod 8 and the spring is held in this compressed position and the rod in the position shown with its pointed head completely confined within the casing 1 by pin portions 48 and 55 of arms 39 and 54 respectively, said pin portions being confined within openings 13 and 15 and openings 14 and 16 respectively. The prong 27 and the arm 31 are positioned as shown in Figure 4. In order to permit the immediate discharge of the rod 8, so that it will assume the position shown in Figures 1 to 3 inclusive and Figure 5, the bifurcated hand grip 50 must first be pressed toward the handle 2, so that the cam 57 acts to remove pin portion 55 from openings 14 and 16. This operation places the rod 8 in position for instantaneous discharge from the casing, when the head 47 of rod 46 contacts any portion of the body of a fish and forces the rod 46 upwardly, so that it causes the removal of pin portion 48 from openings 13 and 15. Upon the occurrence of this action rod 8 is forcefully discharged under the influence of the spring 30 until it reaches the position shown in Figures 1 to 3 inclusive and Figure 5.

When the rod 8 is discharged as stated, the prong 27, though free to move on its pivot, takes the position shown in Figures 2 and 4. The position of the prong 27 shown in Figures 1 and 3 is normally assumed after the fish has been impaled by the head 26 and the prong 27, the prong reaching this position through the forces opposing each other as the fish seeks to resist capture. It is evident that, regardless of the action of the fish, once the head 26 and the prong 27 are inserted in the body of the fish, they cannot be removed without either mutilating and damaging the fish or permitting the prong 27 to assume the position shown in Figure 5. It is a simple task, once the fish has been landed, to slide the arm 31 into the position shown in Figure 5, so that the prong 27 may assume the position shown therein. After the prong is positioned as shown, the head and prong may be removed from the fish without damaging or multilating it. The arm 31 is again reset, so that the prong 27 can assume the position shown in Figures 2 and 4 or the position shown in Figures 1 and 3, unless the arm 31 is released. When arm 31 is reset, the device may be again placed in the position shown in Figure 4 by pulling the cocking members 61 and 62 upwardly, so that the rod 8 is drawn into the casing 1 and locked against accidental discharge. When this operation is completed, the device is ready to repeat the cycle of operations stated above.

The modified mechanism shown in Figure 6 in no way alters the sequence of operation heretofore stated. Before the rod 8 can be discharged from the casing 1, it is necessary to release the pin portion 71 from openings 14 and 16 by applying the same action on pin 67 as is applied to the hand grip 50.

The invention has been described in connection with a specific, illustrated embodiment. However, it should be understood that the invention in its broader aspect is not limited to the specific construction herein shown and described since changes in the size, proportion, and mechanical relations, as well as additions, omissions, and substitutions may be made in the construction and assembly by those skilled in the art without departing from the broad aspect of this invention.

Having thus disclosed the invention, what is claimed as new and useful and upon which it is desired to secure Letters Patent is:

1. In a device of the class described, a cylindrical casing, a rod mounted for longitudinal movement within said casing, a coil spring encircling a portion of said rod and confined within said casing, said spring, when compressed, acting as the driving force by which a portion of said rod is projected from the casing, a pressure responsive mechanism associated with said casing and disengageably engageable to said rod and adapted to control the projection of a portion of said rod from said casing upon contact of said pressure-responsive mechanism with any object, and means associated with said casing and disengageably engageable to said rod for preventing the projection of said rod by the accidental disengagement of said pressure-responsive mechanism.

2. In a device of the class described, a cylindrical casing, a rod mounted for longitudinal movement within said casing, impaling means secured to and adjacent one end of said rod, means secured to and slidably mounted with respect to said rod adapted to control the position of said impaling means, a coil spring encircling the upper portion of said rod and confined within said casing, said spring, when compressed, acting as the driving force by which the lower portion of said rod is projected from the casing, a pressure-responsive mechanism associated with said casing and disengageably engageable to said rod and adapted to control the projection of a portion of said rod from said casing upon contact of said pressure-responsive mechanism with any object, and means associated with said casing and disengageably engageable to said rod for preventing the projection of said rod by the accidental disengagement of said pressure-responsive mechanism.

3. In a device of the class described, a cylindrical casing, a rod mounted for longitudinal movement within said casing, impaling means secured to and adjacent one end of said rod, means slidably mounted with respect to said rod adapted to control the position of said impaling means, a piston secured substantially midway of said rod adapted for reciprocation within said casing, a coil spring encircling said rod and partially confined within said piston, said spring, when compressed, acting as the driving force by which a portion of said rod is projected from the casing, a pressure-responsive mechanism associated with said casing and disengageably engageable to said rod and adapted to control the projection of a portion of said rod from said casing upon contact of said pressure-responsive mechanism with any object, and means associated with said casing and disengageably engageable to said rod for preventing the projection of said rod by the accidental disengagement of said pressure-responsive mechanism.

4. In a device of the class described, a cylindrical casing, a rod mounted for longitudinal movement within said casing, said rod having an elongated slot therein, a prong pivotally secured to said rod and confinable within said elongated slot, means secured to said rod for controlling the position of said prong, compressible means confined within said casing and positioned with respect to said rod to normally urge said rod to be projected from said casing, a pressure-responsive mechanism associated with said casing and disengageably engageable to said rod and adapted to control the projection of a portion of said rod from said casing upon contact of said pressure-responsive mechanism with any object, and means associated with said casing and disengageably engageable to said rod for preventing the projection of said rod by the accidental disengagement of said pressure-responsive mechanism.

5. In a device of the class described, a cylindrical casing, a pair of elongated slots formed in said casing in direct alignment with each other, a rod mounted for longitudinal movement within said casing, said rod having an elongated slot therein, impaling means pivotally secured to and confinable within said elongated slot, means secured to said rod for controlling the position of said prong, compressible means confined within said casing and positioned with respect to said rod to normally urge said rod to be projected from said casing, a pressure-responsive mechanism associated with said casing and disengageably engageable to said rod and adapted to control the projection of a portion of said rod from said casing upon contact of said pressure-responsive mechanism with any object, means associated with said casing and disengageably engageable to said rod for preventing the projection of said rod by the accidental disengagement of said pressure-responsive mechanism, and means indirectly secured to said rod and operatively positioned within the elongated slots formed in the casing for retracting the projected portion of said rod into said casing and simultaneously compress said compressible means.

6. In a device of the class described, a cylindrical casing, a rod mounted for longitudinal movement within said casing, a coil spring encircling a portion of said rod and confined within said casing, said spring, when compressed, acting as the driving force by which a portion of said rod is projected from the casing, an arm secured to the casing and engageable to the rod, when the rod is fully confined within the casing against the resistance of the compressed spring, whereby the rod is held against movement, a pressure-responsive means slidably disposed on the outside of said casing and associated with said arm for releasing the arm from its engagement with the rod, said pressure-responsive means adapted to control the projection of a portion of said rod from said casing upon contact of said pressure-responsive means with any object, and means associated with said casing and disengageably engageable to said rod for preventing the projection of said rod by the accidental disengagement of said pressure-responsive means.

7. In a device of the class described, a cylindrical casing, a rod mounted for longitudinal movement within said casing, impaling means secured to and adjacent one end of said rod, means secured to and slidably mounted with respect to said rod adapted to control the position of said impaling means, a coil spring encircling the upper portion of said rod and confined within said casing, said spring, when compressed, acting as the driving force by which the lower portion of said rod is projected from the casing, an arm secured to the casing and engageable to the rod, when the rod is fully confined within the casing against the resistance of the compressed spring, whereby the rod is held against movement, a pressure-responsive means slidably disposed on the outside of said casing and associated with said arm for releasing the arm from its engagement with the rod, said pressure-responsive means adapted to control the projection of a portion of said rod from said casing upon contact of said pressure-responsive means with any object, and means associated with said casing and disengageably engageable to said rod for preventing the projection of said rod by the accidental disengagement of said pressure-responsive means.

8. In a device of the class described, a cylindrical casing, a rod mounted for longitudinal movement within said casing, impaling means secured to and adjacent one end of said rod, means slidably mounted with respect to said rod adapted to control the position of said impaling means, a piston secured substantially midway of said rod adapted for reciprocation within said casing, a coil spring encircling said rod and partially confined within said piston, said spring, when compressed, acting as the driving force by which a portion of said rod is projected from the casing, an arm secured to the casing and engageable to the rod, when the rod is fully confined within the casing against the resistance of the compressed spring, whereby the rod is held against movement, a pressure-responsive means slidably disposed on the outside of said casing and associated with said arm for releasing the arm from its engagement with the rod, said pressure-responsive means adapted to control the projection of a portion of said rod from said casing upon contact of said pressure-responsive means with any object, and means associated with said casing and disengageably engageable to said rod for preventing the projection of said rod by the accidental disengagement of said pressure-responsive means.

9. In a device of the class described, a cylindrical casing, a rod mounted for longitudinal movement within said casing, a coil spring encircling a portion of said rod and confined within said casing, said spring, when compressed, acting as the driving force by which a portion of said rod is projected from the casing, a pressure-responsive mechanism associated with said casing and disengageably engageable to said rod and adapted to control the projection of a portion of said rod from said casing upon contact of said pressure-responsive mechanism with any object, an arm secured to the casing and engageable to the rod when the rod is fully confined within the casing against the resistance of the compressed spring, whereby the rod is held against movement, and manually actuated means secured to said arm and said casing whereby the arm may be disengaged from the rod to thereby permit the projection of a portion of the rod upon contact of said pressure-responsive mechanism with any object.

10. In a device of the class described, a cylindrical casing, a rod mounted for longitudinal movement within said casing, impaling means secured to and adjacent one end of said rod, means secured to and slidably mounted with respect to said rod adapted to control the position of said impaling means, a coil spring encircling a portion of said rod and confined within said casing, said spring, when compressed, acting as the driving force by which a portion of said rod is projected from the casing, a pressure-responsive mechanism associated with said casing and disengageably engageable to said rod and adapted to control the projection of a portion of said rod from said casing upon contact of said pressure-responsive mechanism with any object, an arm secured to the casing and engageable to the rod when the rod is fully confined within the casing against the resistance of the compressed spring, whereby the rod is held against movement, and manually actuated means secured to said arm and said casing whereby the arm may be disengaged from the rod to thereby permit the projection of a portion of the rod upon contact of said pressure-responsive mechanism with any object.

11. In a device of the class described, a cylindrical casing, a rod mounted for longitudinal movement within said casing, impaling means secured to and adjacent one end of said rod, means slidably mounted with respect to said rod adapted to control the position of said impaling means, a piston secured substantially midway of said rod adapted for reciprocation within said casing, a coil spring encircling said rod and partially confined within said piston, said spring, when compressed, acting as the driving force by which a portion of said rod is projected from the casing, a pressure-responsive mechanism associated with said casing and disengageably engageable to said rod and adapted to control the projection of a portion of said rod from said casing upon contact of said pressure-responsive mechanism with any object, an arm secured to the casing and engageable to the rod when the rod is fully confined within the casing against the resistance of the compressed spring, whereby the rod is held against movement, and manually actuated means secured to said arm and said casing whereby the arm may be disengaged from the rod to thereby permit the projection of a portion of the rod upon contact of said pressure-responsive mechanism with any object.

12. In a device of the class described, a cylindrical casing, a handle extending laterally from the top of said casing, a pair of elongated slots formed in said casing in direct alignment with each other, a rod mounted for longitudinal movement within said casing, said rod having an elongated slot therein, a prong pivotally secured to and confinable within said elongated slot, an arm slidably secured to said rod for controlling the position of said prong, a piston secured substantially midway of said rod adapted for reciprocation within said casing, a coil spring encircling said rod and partially confined within said piston, said spring adapted to normally urge said rod to be projected from said casing, an arm secured to the casing and engageable to the rod, when the rod is fully confined within the casing against the resistance of the compressed spring whereby the rod is held against movement, pressure-responsive means slidably disposed on the outside of said casing and associated with said arm for releasing the arm from its engagement with the rod, said pressure-responsive means adapted to control the projection of a portion of said rod from said casing upon contact of said pressure-responsive means with any object, another arm secured to the opposite side of the casing and engageable to the rod when the rod is fully confined within the casing against the resistance of the compressed spring whereby the rod is held against movement, and manually actuated means secured to said last-mentioned arm and said casing whereby the said last-mentioned arm may be disengaged from the rod to thereby permit the disengagement of the first-mentioned arm upon contact of said pressure-responsive means with any object.

13. In a device of the class described, a cylindrical casing, a handle extending laterally from the top of said casing, a pair of elongated slots formed in said casing in direct alignment with each other, a rod mounted for longitudinal movement within said casing, said rod having an elongated slot therein, a prong pivotally secured to and confinable within said elongated slot, an arm slidably secured to said rod for controlling the position of said prong, a piston secured substantially midway of said rod adapted for reciprocation within said casing, a coil spring encircling said rod and partially confined within said piston, said spring adapted to normally urge said rod to be projected from said casing, an arm secured to the casing and engageable to the rod, when the rod is fully confined within the casing against the resistance of the compressed spring whereby the rod is held against movement, pressure-responsive means slidably disposed on the outside of said casing and associated with said arm for releasing the arm from its engagement with the rod, said pressure-responsive means adapted to control the projection of a portion of said rod from said casing upon contact of said pressure-responsive means with any object, another arm secured to the opposite side of the casing and engageable to the rod when the rod is fully confined within the casing against the resistance of the compressed spring whereby the rod is held against movement, and means indirectly secured to said rod and operatively positioned within the elongated slots formed in the casing for retracting the projected portion of said rod into said casing and to simultaneously compress said coil spring.

ISAAC GELLER.